Patented July 21, 1931

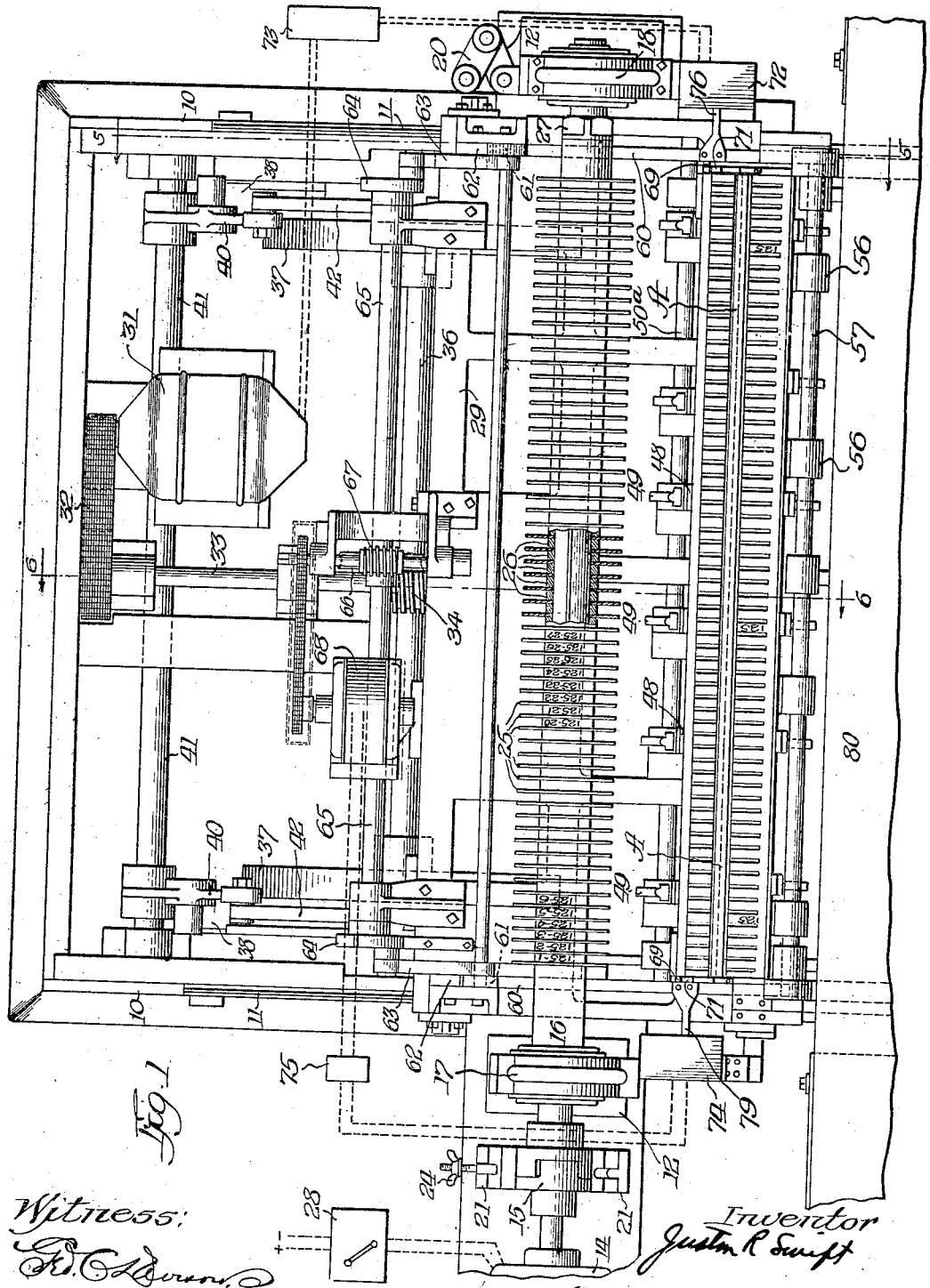

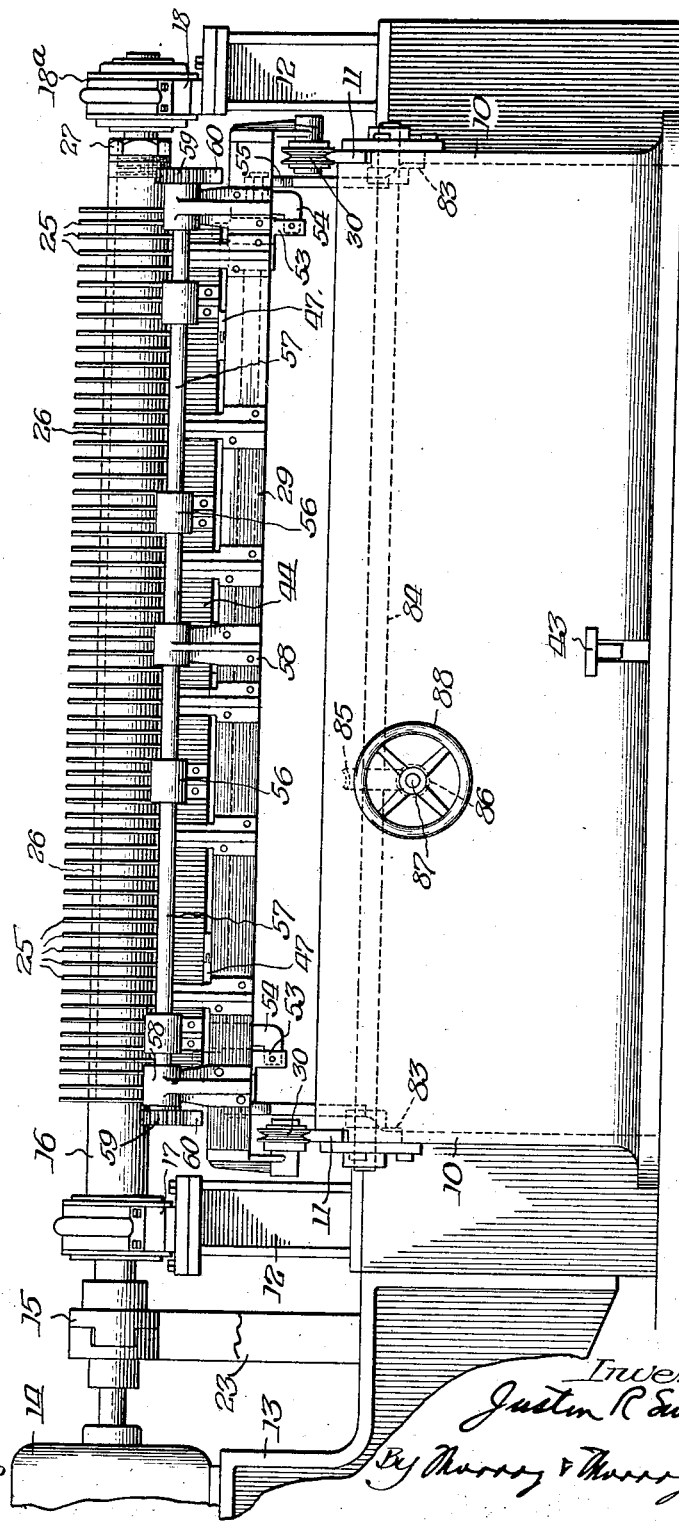

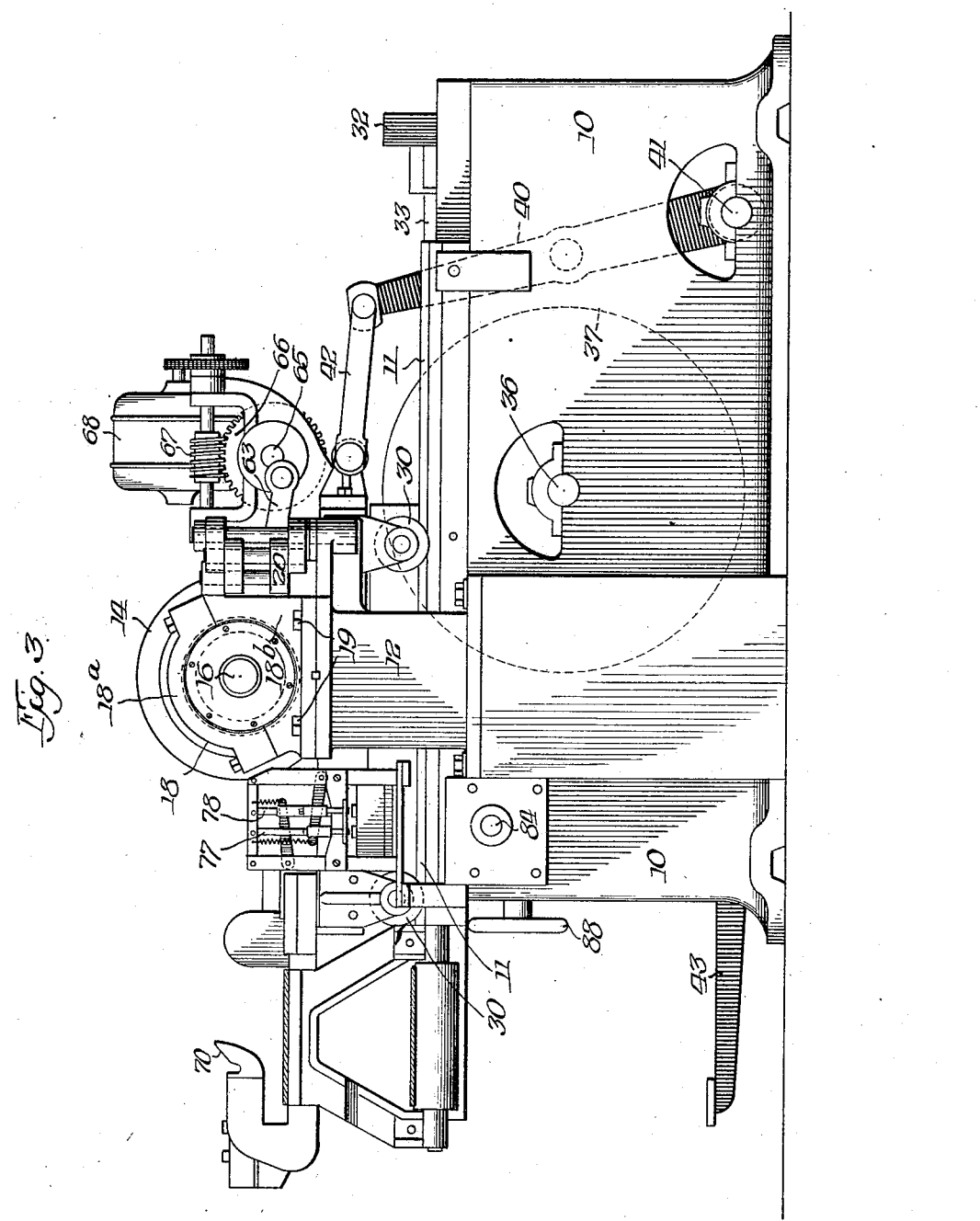

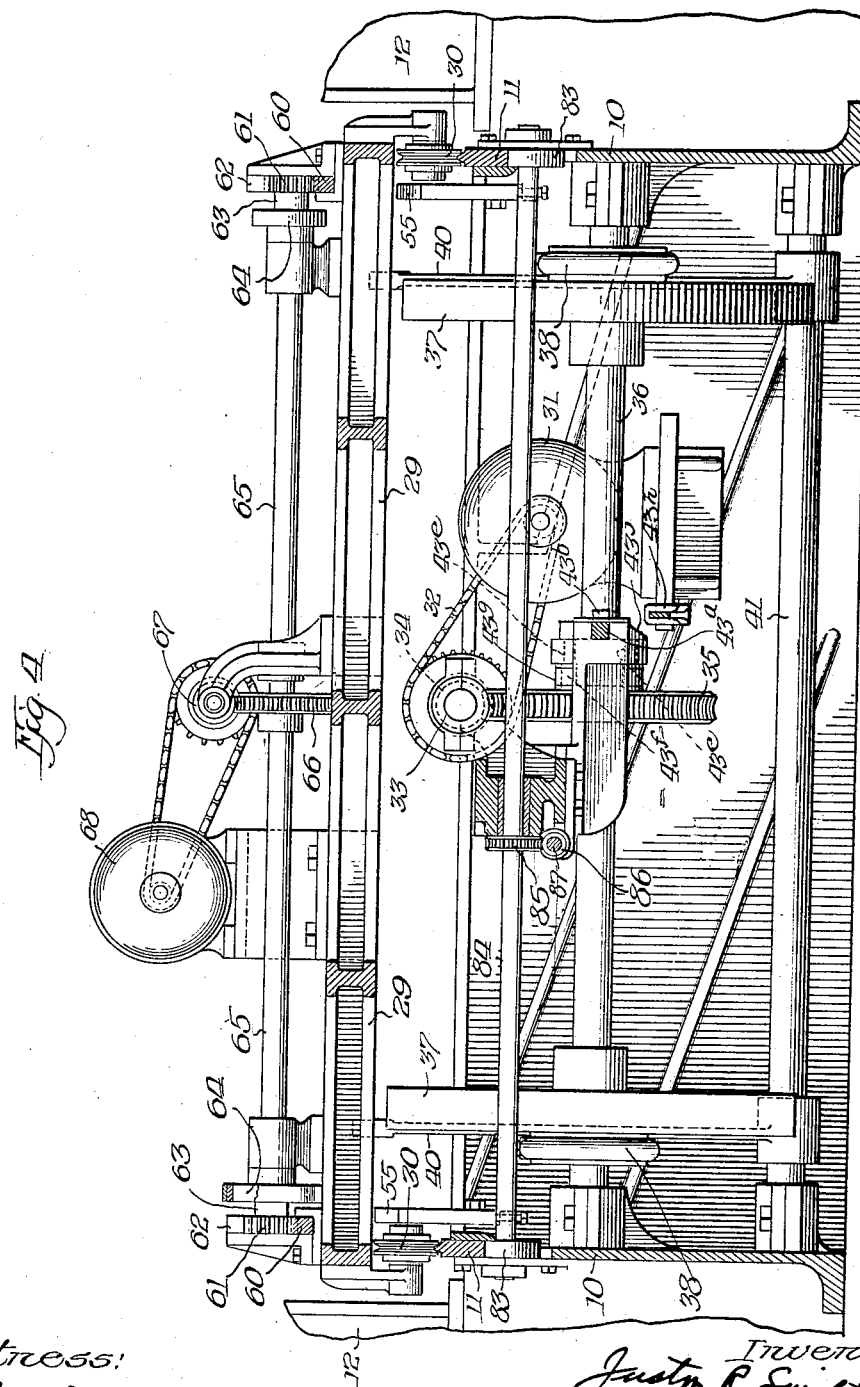

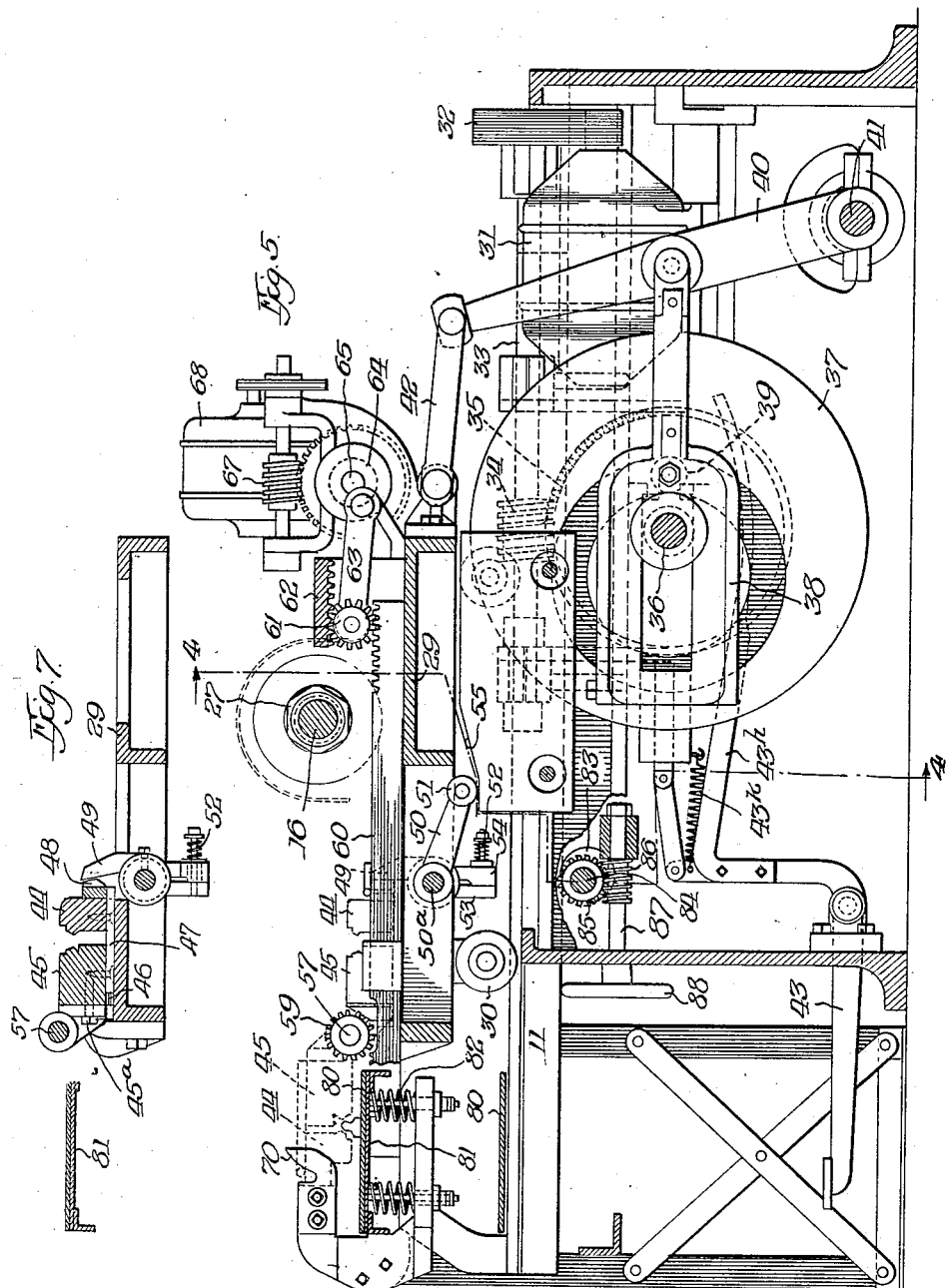

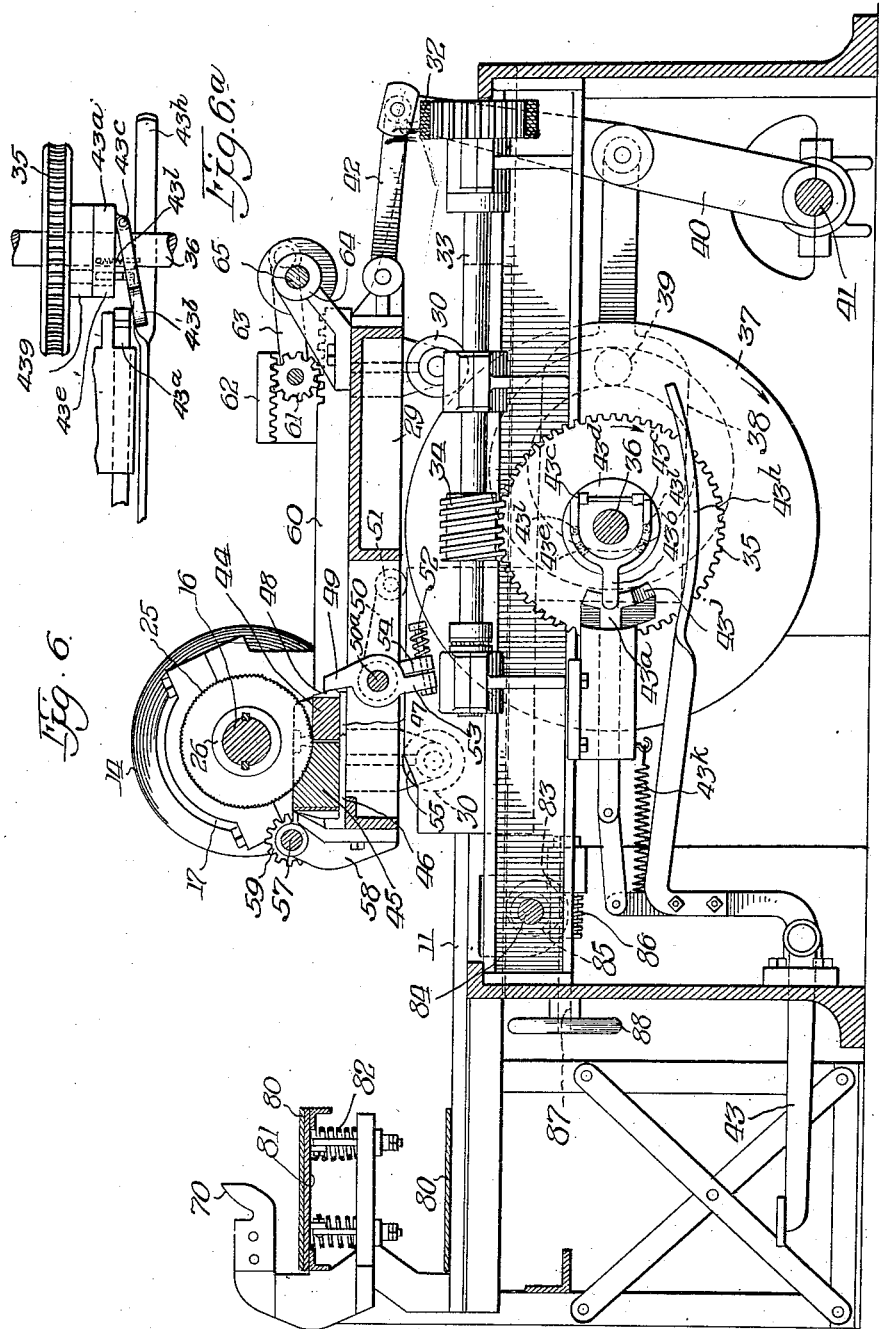

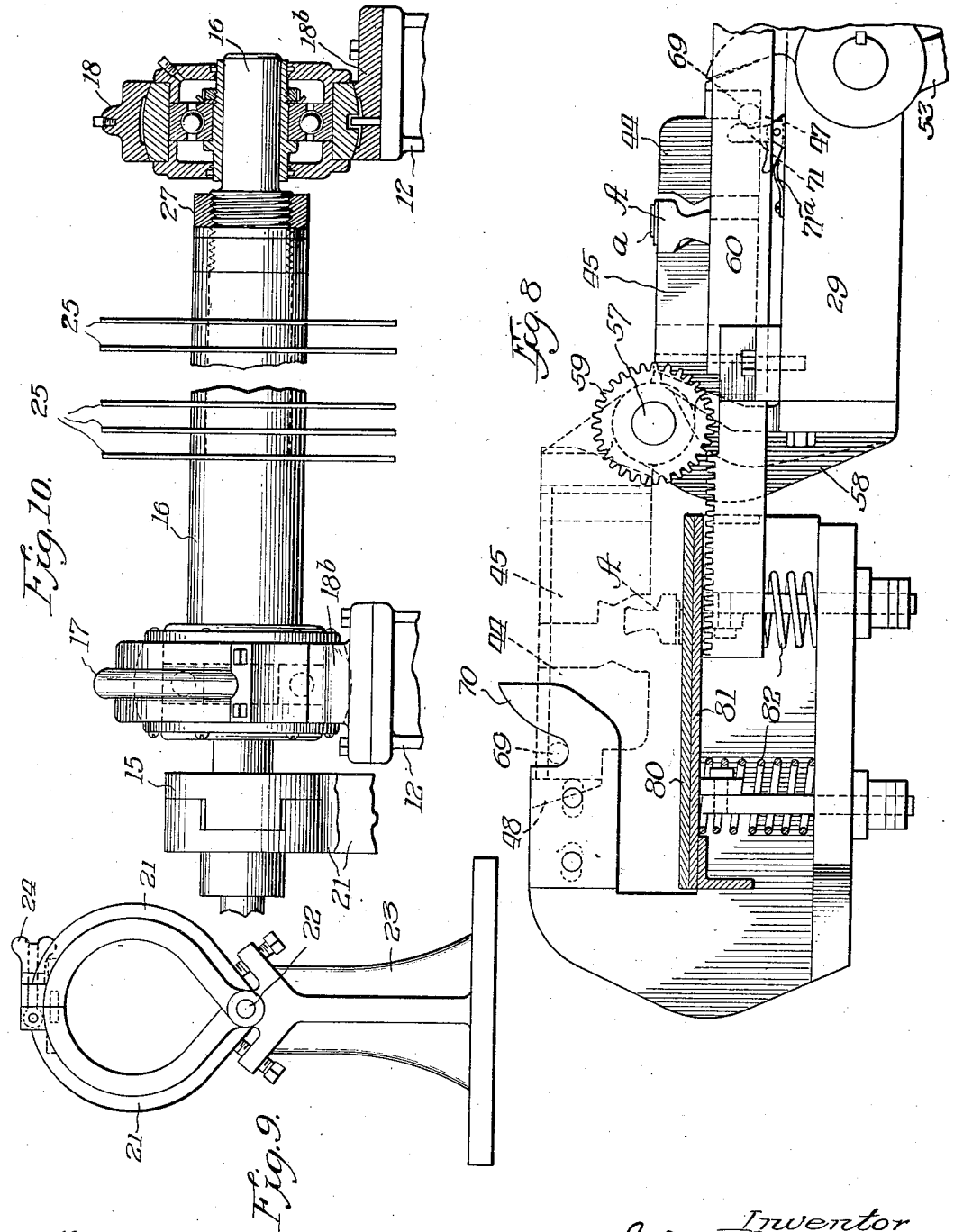

1,815,222

UNITED STATES PATENT OFFICE

JUSTIN R. SWIFT, OF CHICAGO, ILLINOIS

GANG SAW

Application filed March 10, 1928. Serial No. 260,789.

My invention relates to machinery for the severing of a plurality of articles from an elongated blank. This application is a continuation in part of my application Serial No. 179,795, filed March 31, 1927.

The invention particularly relates to means for manufacturing rubber stamp backs or handles in sets. A set of stamps for certain uses consists of many pieces, sometimes as many as 80 to 100. It has been the practice heretofore in the production of these sets to furnish the stamp separately; in other words, to form the stamp backs singly and then to attach the rubber facing thereto.

According to my method, an elongated strip or section of molding is employed, the length being sufficient to provide material for a complete set or series of stamps. To the face of this blank is applied a strip of rubber containing, in proper sequence, the reversely arranged figures or numbers required in the set. Thereafter, the blank with the rubber facing attached thereto is placed in the machine of my invention and passed through the saws, the severing being effected in accordance with a pre-determined spacing intended to accomplish the completion of the set in a single severing act.

This involves a problem more difficult than appears from the mere statement of the facts. Prior practice has demonstrated the possibility of mounting a number of circular saws on a single shaft supported between rigid bearings. By utilizing saws of relatively large diameter a very large shaft may be utilized, the shaft having sufficient stiffness to resist lateral deflection and to operate around its geometrical axis at its designed speed and load. The capacity of such saws is, however, limited due to the fact that the excessive diameter of the shaft encroaches on the cutting area of the saw and restricts the thickness of material that may be passed through the saws. An increase in the diameter of the saws serves only partially to compensate for this shortcoming for the reason that an increase in saw diameters involves an increase in the dead weight and developed centrifugal force and requires a further increase in shaft diameter. Furthermore, the cost of conditioning of the saws, increases in proportion to the increase in the diameter of the same.

The specific difficulties encountered in the design of the machine under consideration are not solved by the application of the knowledge gained from the prior practice. In the carrying out of my idea, I contemplate the use of a single machine for the production of sets of articles containing in many instances 75 to 100 pieces, and the pieces of the different sets will be of different widths, involving different spacing of the saws. In the production of one set, perhaps 50 saws may be required, and in the next set 80 to 100 saws may be required. Even in sets having substantially the same number of pieces, the spacing of the saws is different. Obviously a shaft of sufficient diameter could not be employed to carry all the saws and to rotate about its geometrical axis. Consequently, means should be provided that would permit the shaft to rotate freely about its axis at critical speeds. Furthermore, the axes will be different with different numbers of saws and with different spacing of the saws due to differences in dead weight.

A long shaft with an extended space between bearings and carrying a dead load will be somewhat bent. Upon starting in motion there is rotation about the shaft axis (which is somewhat curved) and revolution about the theoretical axis. With the shaft in a bent condition, the metal outside of the shaft axis must be stretched before the shaft can be rotated, and every molecule of the steel (except at the exact center of the shaft) must be subjected to a stretch and return for every rotation of the shaft. The wobbling and incidental "stretch and return" can recur or be repeated only with a certain rapidity;—beyond that point the metal is not capable of such rapid reactions and the resistance thereto overcomes the centrifugal force exerted by the overhung weight and forces the shaft back to the straight position.

By mounting the shaft in self aligning bearings the shaft can flex throughout its length whereas in solid bearings the bends would be concentrated at points close to the bearings, resulting in crystallization and ultimate failure.

In the specification and claims I have used the term "critical speed" to mean that condition of shaft rotation where there is wobbling and consequent vibration, resulting in displacement of the saws out of a plane perpendicular to the theoretical or geometrical axis of the shaft.

By mounting the shaft in two self-aligning bearings, all the saws being carried on the shaft between such bearings, I am able to use relatively small diameter saws and a shaft of such comparatively small diameter that the working area of the saws is not unduly reduced. I do not use any intervening bearings, because, due to the nature of the operations to be performed, it would involve a waste of material in the articles produced, a complication in the pre-assembly steps and a complication in the removal and replacement of the saws and spacers for the production of the different sets.

A desirable feature in connection with the design is that the rotating element should be provided with sufficient power storage to carry the saws through the article to be severed without substantial change of speed, thus insuring a substantially constant axis. The rotor of the motor, the shaft, the saws and the spacing devices provide power storage capacity that will undoubtedly be found ample in most cases without a fly wheel.

As a desirable expedient in the carrying out of the process, I provide a series of spacing collars for the saws, each collar bearing a designation of the corresponding set of stamps to be produced and also a designation to indicate its relation in the series. Thus, for each set of devices to be produced, I have a set of spacing collars. As an adjunct to this arrangement, I provide a blank holder having kerfs in correspondingly spaced relation, each blank holder being likewise numbered or otherwise designated to correspond to the set calling for that spacing. The blank holder is adapted to be inserted in the machine and to act as a clamp for the blank during and after the severing operation and to be released in order to discharge the severed units as a set onto a conveyor or other means for disposing of the product.

Thus it will be seen that the problem to be solved involves the following:

1. Cutting a large number of objects of varying lengths at the same time, some of said objects being very small.
2. Maintaining the objects in sets and in proper sequence.
3. Conducting the sets so maintained in sequence into position to be packaged by automatic or semi-automatic means.
4. All of the above to be carried out at a high production rate.

The invention will be more readily understood by reference to the accompanying drawings, in which—

Fig. 1 is a plan view of a machine constructed in accordance with my invention;
Fig. 2 is a front view thereof;
Fig. 3 is a view taken from the right hand side of the machine;
Fig. 4 is a sectional view on the line 4—4 of Fig. 5;
Fig. 5 is a sectional view on the line 5—5 of Fig. 1;
Fig. 6 is a similar view taken on the line 6—6 of Fig. 1 with the table in a different position;
Fig. 6a is a fragmentary plan view showing the clutch arrangement.
Fig. 7 is a detail sectional view of the blank clamp or template;
Fig. 8 is an enlarged detail view partly in section, showing the blank clamp in released position, and
Fig. 9 is a detail elevation of a temporary device utilized as a shaft holder.
Fig. 10 is an enlarged elevation partly in section, showing the mounting for the saw shaft.

In the drawings I have illustrated a machine having a bed, including side frame members 10 for supporting tracks 11, bearing posts 12, and motor support 13. A motor 14 is mounted on the support and is connected through the coupling 15 to the saw shaft 16. The shaft is of comparatively large size and is supported at its extremities only, in the self aligning bearings 17, 18. These bearings may be of any desired construction, preferably of the construction shown at the right hand end of Fig. 10. This specific construction being no part of applicant's invention is not described in detail or claimed herein.

As best shown in Figs. 1 and 3, the bearing 18 is transversely divided, the upper half 18—a being separable from the lower half 18—b, which is secured by means of the cap screws 19 to the post 12. The lower half 18—b is mounted on the links 20 in such manner that upon removal of the cap screws, the lower half may be swung outwardly and away from the end of the shaft. This leaves the end of the shaft free for the insertion and removal of saws and collars as hereinafter described. Before doing this the device illustrated in Figs. 1 and 9 is brought to play. The two arms 21 which are pivoted at 22 to a standard 23 are swung upward into the position of Fig. 9 around the coupling 15 and firmly clamped in place by means of the thumb nut 24. This, together with bearing 17, serves to hold the shaft and prevent the transmission of any strain to the motor when the outer end of the shaft is unsupported. It is also used as a brake to hold the arbor during assembly and removal of saws.

Mounted on the shaft 16 are saws 25 arranged in desired spaced relation by means of the collars 26. For each set of devices to be produced the collars are designated by a general number indicating the number of the set, each collar also having a specific number to designate its position relative to the other collars. In other words, the first collar on the left hand side as viewed in Fig. 1 is designated 125—1, 125 indicating the number of the set and 1 indicating the position of the collar. I have shown 63 saws on the shaft, the set of stamps to be produced requiring that number. According to this set-up, there will be, as indicated, 63 collars each properly designated. My invention, however contemplates the production of sets in which there may be many more units produced at one operation. If a lesser number are required, the spacing of the saws on the shaft is arranged accordingly, the remainder of space in the length of the shaft being merely filled with a long collar.

After the saws and collars have been properly positioned they are suitably clamped in place by means of the clamp nut 27 near the end of the shaft.

In order to effectively secure the proper operation of the device to avoid certain critical speeds, it is essential that means should be provided for varying the motor speed within certain limits. This is accomplished by employing a frequency changer indicated generally by the numeral 28 in Fig. 1. This is necessary for the following reasons:

It is desirable that the motor should be directly connected to the shaft; it is furthermore desirable, and in fact essential, that the shaft speed should be in excess of 4,000 R. P. M. to secure the necessary peripheral speed of the saws without employing saws of too great diameter. No motors capable of such speed are produced for operation on ordinary 60 cycle current. By providing means for changing the frequency, I am able to secure motor speeds as great as desired and varying such speeds as necessary in order to avoid critical speeds of the shaft. It will be understood that for each saw arrangement either as to number or spacing, there is a different series of critical speeds; in other words, speeds at which the shaft is subject to lateral distortions due to unbalanced centers and between which critical speeds there are speeds at which such shaft distortions are negligible. Therefore, I consider that any saw arrangement of the character illustrated should include means for varying the operating speed of the shaft within limits. It is possible that other means for securing speed changes at the high speeds required may be devised, although any such other means are not now known to me.

A blank such as intended to be operated on is indicated at A in Fig. 8. It may be a long strip such as shown in Fig. 1 containing on its face or bottom surface a small elongated strip of rubber containing in proper sequence the characters forming a part of the set. As a preliminary operation, the strip of rubber is glued to the long blank.

The means for supporting, clamping, reciprocating and discharging the article comprise a table having a horizontal frame 29 supported on rollers 30 that co-operate with the track 11. As a means for reciprocating the table, I provide a motor 31 connected by a chain 32 to a shaft 33, the shaft carrying a worm 34 acting on a worm wheel 35. The worm wheel 35 is fixed to a shaft 36 that has bearings on the side frames 10 and carries at opposite sides of the machine the two cam wheels 37. Yokes 38 have pins 39 engaging the cam tracks to effect reciprocation of the yokes which are connected to rockers 40. The rockers are pivoted at 41 to the frame and at their opposite ends are connected by means of links 42 to the table 29. Thus at each rotation of the cam wheels 37, the table is reciprocated once. A clutch, best shown in Fig. 6, is operated by means of a foot treadle 43 to effect one revolution only of the cam wheels.

The depression of the treadle acts to retract an arcuate member 43—a which holds out the free end of a yoke 43—b pivoted at 43—c to a disk 43—d, against the force of the springs 43L. Pins 43—e project from the side of the yoke through holes in the disk and are adapted to register with similar holes 43—f in a disk 43—g pinned to the shaft 36. As the cam member 43a is withdrawn, it permits the pins to enter the openings provided therefor and to lock the two disks together. As rotation continues, the projection from the yoke 43—b contacts the curved extension 43—h to return the treadle to its upper position and to insure that the yoke will after completing one revolution ride up on the cam surface 43—j and withdraw the pins from engagement. A coil spring 43k tends to restore the treadle to the position shown in the drawings.

The table carries thereon a blank holder consisting of two parts 45, 44 both composed of wood, preferably end wood, the former being rigidly bolted to a metal base and back 46, while the latter is also secured to a metal base 47 which is dovetailed with and slidable relative to the metal base 46. Located on the back side of the wood member 44 and arranged in spaced relation are metal plates 48 adapted to be contacted by an arm 49 of a two part bell crank, the other arm 50 of which carries a roller 51. The two arms of the bell crank are separately mounted on a shaft 50a and are joined by a spring bolt 52 acting through the two ears 53, 54, one of which is integral with each of the arms 49, 50. The roller 51 co-operates with the track 55 rigid with the bed of the machine and shaped to effect oscillation of the arm as required to clamp the blank at the proper time and to release it in proper sequence thereafter.

The holder consisting of the wood parts 44, 45 and the attached metal parts 46, 47 is readily removably mounted on the shaft 57 and a holder is provided for each set of articles to be produced. The kerfs in the holder will be spaced according to the spacing of the collars 25 on the saw shaft and the holder will be identified by a number the same as the general number on the collars; that is, in this case 125.

The metal parts 46, 47 for the blank holder are secured by screws 45—a to ears 56 that have a bearing on the transverse shaft 57. The ends of the shaft are suitably held in bearings carried in the brackets 58 bolted to the table. Also rigid with the shaft 57 are pinions 59 that engage with racks 60 one at each side of the machine and are adapted to be reciprocated in order to effect oscillation of the blank holder about the shaft 57 as a center. The means for effecting reciprocation of the racks comprises the pinions 61 that engage with the racks on one side and with the fixed rack 62 on the opposite side, the pinion 61 being reciprocated by means of the links 63 which act as connecting rods. The connecting rods are reciprocated by means of the cranks 64 fixed to the shaft 65 which extends across the machine. The shaft 65 carries a worm wheel 66 which is actuated by means of a worm 67 operated by a motor 68, mounted on the table.

As a means for opening the jaws 44, 45 constituting the holder to permit insertion of a blank and to insure proper discharge of the severed blank, I provide at each end of the holder and attached to the metal part 47, pins 69, so positioned that they are adapted to co-operate with the hook shaped brackets 70 best shown in Figs. 3, 6 and 8, and to forcibly withdraw the moveable part of the holder when the holder has been rotated into dumping position as shown in dotted lines in Fig. 8. Upon the return of the holder to its normal position the pin contacts with the spring pressed dog 71 which insures the opening of the holder if it has been closed in its return movement. The dog 71 is mounted on the part 29 of the frame and is resiliently retained in operative position by the spring 71a. On the closing movement of the jaws, the force of the spring 71 is overcome thus permitting the jaws to close.

In order to effect the reciprocation of the table and oscillation of the holder all in proper timed relation, I provide different motors as described, the control of which is effected by means of switches, a detail of one of which is illustrated in Fig. 3. The switch 72 at the right hand side of the machine acting through a relay 73 controls the table motor 31, while the switch 74 at the left hand side of the machine as viewed in Fig. 1 acting through a relay 75 controls the dumping motor 68. An arm 76 attached to one of the racks 60 acts on a plunger 77 in the switch 72 to close a contact and through the relay to stop the table motor when the table has reached an extreme rearward position and during the act of dumping the several blanks from the holder. As the rack reaches a point near its return position; that is, with the holder in its lowered or normal position, the finger 76 acts on the plunger 78 which acts to close a contact and through the relay to start the table motor. This, however, will not effect movement of the table, which will remain stationary until the controlling clutch is actuated. I stop the table motor during the dumping act in order to avoid trouble by accidentally stepping on the clutch treadle during such act.

On the other end of the machine a finger 79, also attached to a rack bar acts to contact similar plungers and to start and stop the dumping motor 68 as required.

As best shown in Figs. 6 and 7, I provide a belt conveyor 80, the upper portion of which slides over the plate 81 supported by springs 82. The arrangement is such that if an obstruction such as a plurality of previously cut blanks should be on the conveyor at the time the holder moves into dumping position, the conveyor and plate would be depressed and breakage avoided.

In order to compensate for reduction of size of the saws by filing or wear, the table may be vertically adjusted by means of the cams 83 best shown in Figs. 4, 5 and 6 located beneath the tracks 11 and operated by a shaft 84 carrying a worm wheel 85. The worm wheel 86 is carried on a shaft 87 which terminates in a hand wheel 88 and serves as a means for manual adjustment of the cams.

The operation of the machine is as follows:

Assuming the parts in the position of Fig. 1; that is, with the holder in full line position of Fig. 8, the operator steps on the treadle 43 thereby actuating the clutch shown in Fig. 6. The table motor 31 being in operation, the table is started forward, it being assumed that a blank A has been placed in the position shown in Fig. 8. As the table moves forward, the roller 51 on the bell crank rides up the incline 55 and moves the part 45 of the holder into clamping position where it is held by the travel of the roller along the flat surface provided therefor. The saws being in operation under the action of the motor and being rotated at a peripheral speed of approximately 10,000 feet per minute, the blank is severed cleanly and smoothly and in such manner that no further polishing or finishing operations are necessary on the sides of the severed articles. After having passed through the saws, the table moves backward and as it reaches a point where the finger 79 contacts a switch member in the switch 74, the dumping motor is started, thus transmitting movement to the rack bars 60. Practically simultaneously therewith, the finger 76 acting through the switch 72 stops the table motor. The table has, however, been brought to a stop at approximately the same time by the completion of the cycle permitted by the clutch connection between the table and the motor.

The starting of the racks effects the oscillation of the blank holder, the movable part of the holder having been released by the return of the carriage to its initial position. As the holder is rotated about the shaft 57 as a center, it reaches an inverted position as shown in dotted lines in Fig. 8, where the bracket 70 acting on the pin 69 forcibly opens the jaws of the holder and permits the severed articles to drop on the belt conveyor by means of which they are transmitted to a point ready for boxing. The continued operation of the dumping motor effects the return movement of the racks and the repositioning of the holder, the return movement of the racks actuating the switch 74 to stop the dumping motor 68 and through the finger 75 to effect actuation of the switch 72 to start the table motor. This constitutes a cycle of operation of all the parts.

When a rearrangement of saws is necessary, the shaft is clamped by means of the device shown in Fig. 9 and thereafter the self aligning bearing 18 is removed together with the nut 27 on the shaft 16. The collars and saws may then be removed endwise and replaced by another set as desired. Coincidentally the template or holder is removed and replaced by one having kerfs corresponding to the new set of articles to be produced. The changes necessary to adapt the device for a new set are very simple and involve but few operations.

Obviously the instrumentalities described and shown are capable of considerable modifications and I do not wish to be limited except as indicated in the appended claims.

I claim:

1. In a machine of the class described, the combination of blank severing means, a table, a motor for reciprocating the same, a blank holder mounted for oscillation from a work-receiving to a work-discharging position, a separate motor for oscillating said holder, means operated by said table for starting the oscillation of said holder through its motor, and means actuated by said holder for stopping its oscillation.

2. In a machine of the class described, the combination of blank severing means, a table, a motor for reciprocating the same, a blank holder mounted for oscillation from a work-receiving to a work-discharging position, a separate motor for oscillating said holder, means operated by said table for starting the oscillation of said holder through its motor, and means actuated by said holder for stopping its oscillation and means for stopping the table-operating motor during the cycle of operation of said holder.

3. In a machine of the class described, the combination of blank severing means, a motor for continuously operating the same, a table, a motor for reciprocating the same, a blank holder mounted for oscillation from a work-receiving to a work-discharging position, a separate motor for oscillating said holder, means operated by said table for starting the oscillation of said holder through its motor, and means actuated by said holder for stopping its oscillation.

4. In a machine of the class described the combination of blank severing means, a motor for continuously operating the same, a table, a motor for reciprocating the same, a blank holder mounted on the table, means including a separate motor for moving the holder into an inverted position, means actuated by the movement of the table for starting the movement of the holder, and means actuated by the movement of the holder for stopping its movement at the completion of a cycle of operation.

5. In means for severing a blank into a plurality of units the combination of severing means, a table, a blank holder on the table, means for moving the table, the blank holder and work held by said holder into the zone of operation of said severing means and for returning the table to the initial position, means operated by the movement of the table for clamping and releasing a blank in said holder and means operating after the completion of a cycle of operation of said table for inverting the position of the holder and discharging the several units therefrom.

6. In means for severing a blank into a plurality of units the combination of severing means, a reciprocating table, a blank holder on the table, means operated by the movement of the table for clamping and releasing a blank in said holder and means operating after the completion of a cycle of operation of said table for inverting the position of the holder and discharging the several units therefrom, and means positively preventing the beginning of another cycle of operation of the table until the return of the holder to blank receiving position.

7. In combination, a bed, a shaft having bearings on the bed, a plurality of saws on the shaft between said bearings, a table mounted for reciprocation on the bed, a blank holder mounted for oscillation on the table, driving means for said several elements, manually operated means for starting a cycle of operation of the table, automatically operated means for starting a cycle of operation of the holder after the completion of a cycle of operation of the table, and automatic means for stopping the table at the completion of a cycle of operation thereof and positively preventing manual starting of another cycle until after the completion of the cycle of the holder.

8. In combination, a bed, a shaft, two self-aligning bearings on the bed for carrying the shaft, a relatively large number of saws on the shaft between the bearings, one of said bearings being divided to permit ready separation thereof from the shaft to free one end of the shaft for removal and replacement of saws, and a temporary clamping means adapted to hold the shaft against sagging when said end bearing is removed.

9. In a gang saw, the combination of a saw shaft, two self-aligning bearings for supporting the respective ends of the shaft, saws on the shaft between the bearings, and means for rotating the shaft and saws at high speed, the length of the shaft, the number of saws on the shaft and the speed of revolution being such that the geometrical axis of the shaft is displaced during operation, which displacement is accommodated by said self-aligning bearings.

10. In means for severing a relatively large number of articles in a single operation, the combination of a shaft, saws on said shaft, means for rotating the shaft at effective cutting speed, the number and size of the saws and the length of the shaft being such that at the necessary effective speed of rotation the axis of the shaft is progressively deflected from the ends toward the middle, and self-aligning bearings for supporting the ends of the shaft to accommodate it to such deflection.

In testimony whereof I have affixed my signature.

JUSTIN R. SWIFT.